United States Patent

[11] 3,629,863

[72] Inventor Ronald G. Neale
Birmingham, Mich.
[21] Appl. No. 773,013
[22] Filed Nov. 4, 1968
[45] Patented Dec. 21, 1971
[73] Assignee Energy Conversion Devices, Inc.
Troy, Mich.

[54] FILM DEPOSITED CIRCUITS AND DEVICES THEREFOR
25 Claims, 14 Drawing Figs.

[52] U.S. Cl. .......... 340/173, 307/317, 317/234 V, 317/235 P
[51] Int. Cl. .......... G11c 11/36
[50] Field of Search .......... 340/173, 174; 307/279

[56] References Cited
UNITED STATES PATENTS

| | | | |
|---|---|---|---|
| 3,091,754 | 5/1963 | Nazare .......... | 340/173 |
| 3,245,051 | 4/1966 | Robb .......... | 340/173 |

*Primary Examiner*—Terrell W. Fears
*Attorneys*—Wallenstein, Spangenberg, Hattis and Strampel and Edward G. Fiorito, Esq.

ABSTRACT: An entire circuit is formed by a number of overlapping deposited films of conduct semiconductor and insulating materials. A switching matrix circuit made in accordance with the invention comprises an insulating base, bands of X and Y axes conductors deposited on one side of said insulating base in crossing rows and columns with a layer of insulating material interposed between the X and Y axes conductors at each crossing point to insulate the same. At least one switch device is coupled between each X and Y axes conductor adjacent each active crossing point thereof, the switch device associated with each crossing point including a layer of semiconductor material deposited over the portion of the X or Y axis conductor involved between the associated Y and X axis conductor and the immediately adjacent Y or X axis conductor, the deposited layer of semiconductor material associated with each crossing point having a relatively high-resistance condition which is switched to a relatively low-resistance condition when the value of a voltage applied thereto reaches a first voltage threshold level which low-resistance condition remains until the value of the current therethrough drops below a given holding value.

Inventor
Ronald G. Neale
By: Wallenstein, Spangenberg, Hattis & Strampel Attys

Inventor
Ronald G. Neale
By: Wallenstein, Spangenberg, Hattis & Strampel Attys

Inventor
Ronald G. Neale
By: Wallenstein, Spangenberg, Hattis & Strampel
attys.

Inventor
Ronald G. Neale
By: Wallenstein, Spangenberg, Hattis & Strampel attys.

FILM DEPOSITED CIRCUITS AND DEVICES THEREFOR

One aspect of the present invention relates to memory matrices of the type which comprises a series of X and Y axes conductors forming rows and columns of conductors to be addressed for write (i.e., set and reset or write "1" and write "0" ) and readout operations and to switch devices having utility therein as isolating and memory elements therein for storing binary coded information and the like.

A majority of computers use coincident current magnetic memory matrices where a magnetic core or other magnetic element is located at each crossover point. Such memory matrices are popular because of their high write and readout speeds and random access characteristics.

The memory matrix constituting one aspect of the present invention provides a coincident voltage memory matrix which is less expensive and much easier to use than magnetic and other memory matrices. Unlike the magnetic core memories, the memory matrix of the present invention can be read nondestructively (without erasing the record and requiring a rewrite operation each time). At present, the conventional readout cycle with magnetic memories includes reading, temporary storage, and rewriting before another address can be read. The coincident voltage memory matrix of the invention requires only one step instead of three steps in the readout operation, a simpler subroutine is used to control the readout cycle than in magnetic memories, and the stored data is not exposed to possible error or loss during readout as in the case of magnetic memories. These readout advantages can be very important where stored information will be held during repeated readouts (stored tables of data or the steps of a computer subroutine, for example).

Apart from advantages of the speed and nondestructive readout, the coincident voltage memory of the invention is well suited to driving from transistors because of the modest drive voltage and current levels involved, and readout can be accomplished without expensive multistage sensitive read amplifiers because the readout signal can be at a DC voltage level directly compatible with DC logic circuits, requiring no further amplification.

The coincident voltage memory matrix form of the invention utilizes at each crossover point thereof a series circuit of what will be referred to as a threshold switch device and a memory switch device both most advantageously in the form of deposited films or layer of insulating and semiconductor materials preferably applied by vacuum deposition, sputtering or screening thereof upon bands of conductive material deposited on any suitable base of insulation material, which bands of conductive material constitute the X and Y conductors of the matrix.

Threshold and memory switch devices which may be deposited as films or layers of semiconductor material are disclosed and claimed in U.S. Pat. No. 3,271,591, granted on Sept. 6, 1966, to S. R. Ovshinsky. In this patent, these switch devices are referred to respectively as "Mechanism" and "Hi-Lo" devices. A specific aspect of the invention is the provision of an improved physical construction of the deposited film threshold and memory switch devices which may be of the type disclosed and described in this patent, and another aspect of the invention is in the fabrication of complete circuits, including such threshold and memory switch devices and passive electrical circuit elements, as film deposits on any suitable insulating base so the entire circuit can be compactly made by inexpensive, mass production, batch fabrication techniques. The manufacture of complete circuits including current control devices like the transistors, silicon-controlled rectifiers and the like by depositing these and the other circuit elements as films in a common insulating base has only heretofore been accomplished with much difficulty.

The deposited film threshold switch device used in the memory matrix referred to is a two-terminal device formed by a layer of semiconductor material which switches from a normally high resistance to a low resistance condition when the voltage applied to the opposite surfaces thereof exceeds some threshold value, and reverts to the high-resistance state when the current flow therethrough falls below some minimum value. Semiconductor materials forming threshold switch devices may be of the type disclosed in said U.S. Pat. No. 3,271,591. Such threshold switch devices can be fabricated with a wide selection of threshold levels of modest values (e.g., 5–30 volts) merely by controlling the thickness of the semiconductor films involved. The film deposited memory switch device used in the memory matrix referred to is a two-terminal bistable device formed by a layer of semiconductor material which is triggered into a low resistance condition when a voltage applied to the opposite surfaces of this layer exceeds a given threshold value. The semiconductor layer then remains indefinitely in its low resistance condition even when the applied voltage is removed, until reset to a high resistance condition as by feeding a relatively large reset current therethrough at a voltage below said threshold value. Semiconductor materials forming memory switch devices may be of the type disclosed in said U.S. Pat. No. 3,271,591. It is believed that the semiconductor materials of the threshold and memory switch devices generally conduct current along a filamentous path or paths extending between the surfaces to which the voltage is applied. While for purposes of illustration, reference is made to switch devices of the type disclosed in U.S. Pat. No. 3,271,591, other switch devices having threshold and memory switching characteristics, respectively, similar to those of the devices of the patent may be utilized in the matrix of this invention.

When a threshold switch device is connected in series with a memory switch device, the resulting combination, if the impedances of the two devices are comparable, will require a relatively high voltage (i.e., a voltage in the neighborhood of twice the lower of the threshold values of the devices) to switch both the threshold and memory switch device from high resistance to low-resistance conditions. On the other hand, if the resistances of the two devices are substantially different, the two devices can be driven to their low-resistance conditions by a voltage much less than this value. Such a voltage will first switch one of the devices into its low-resistance condition and then, if the applied voltage is equal to or greater than the threshold value of the other device, will also switch the other device to its low-resistance condition. In the case where the resistances of the two devices are materially different, for reliability sake, it has been determined by persons other than the present inventor that the threshold value of the memory switch devices should be greater than that of the threshold switch devices. A readout operation to determine whether a selected memory switch device is in a low of high resistance condition involves the feeding of a voltage across the associated X and Y conductors which is insufficient to trigger the memory switch device involved when in a high-resistance condition to a low-resistance condition but is sufficient to drive a threshold switch device to its low-resistance condition when it is associated with a memory switch device already in its low-resistance condition.

In accordance with one of the aspects of the present invention, the semiconductor layer of one of the switch devices associated with each crossover point is deposited upon the X conductor involved in the space between the associated Y conductor and the immediately adjacent Y conductor and the semiconductor layer of the other switch device of each crossover point is deposited upon the Y conductor involved in the space between the associated X conductor and the immediately adjacent X conductor. Preferably, the two switch devices are connected in series by a narrow band of conductive material bridging the outermost surfaces of the deposited layers of semiconductor material. The X and Y conductors will, in most cases, be silk screened or otherwise deposited on a surface of a base of insulating material, with each crossover point of each X and Y conductor electrically insulated by a small patch or spot of insulating material located therebetween, the band of conductive material connecting each associated threshold and memory switch device in series being a layer of conductive material deposited over the insulating base with the ends thereof overlapping and bridging the previously deposited semiconductors layers of the switch devices involved.

The X and Y conductors and the aforesaid bridging band of conductive material associated with each crossover point of the matrix may make contact with the opposite surfaces of the associated layers of semiconductor material over an appreciable area. In such case the aforesaid filamentous path or paths of current conduction through each layer of semiconductor material may vary substantially in position each time the device involved is rendered conductive and such variations may significantly vary the threshold value of the device. In accordance with another aspect of the invention, the path of conduction through the semiconductor layer of each deposited threshold or memory switch device of the matrix is constrained to follow a limited consistent path by depositing on each portion of each X and Y conductor where a threshold or memory switch-forming semiconductor layer is to be deposited a spot or patch of insulating material having a small pore therein so that only a small portion of the outer surface of each X or Y conductor involved is exposed for application of the layer of semiconductor material involved. Then, when the layer of threshold or memory switch device-forming semiconductor material is deposited over the spot or patch of insulating material involved the semiconductor material enters the pore of the insulating material and makes contact with the X or Y conductor involved over a very small area. For example, the diameter of each pore and hence the area of contact referred to may be in the range of from about 10 to 100 microns in the most preferred form of the invention, preferably near 10 microns so the filamentous path of current conduction occurring in the semiconductor layer will be consistently through the same body of material. The pore can be formed in the spot or patch of insulating material referred to by depositing a photosensitive acid resist material which becomes fixed when subjected to light on the film-deposited surface of the insulating base involved, placing a photoemulsion mask having light transparent areas on the portions of the mask which are to cover the portions of the resist which are not to be removed with acid or other chemical treatment and light opaque areas on the portion of the mask which are to cover the portions of the resist which are to be removed is to overlie each point on the subjecting assembly to light, developing the photosensitive resist material during which the unexposed portion of the resist material are removed, etching away the exposed portions of the insulating material with a suitable chemical, and then removing the exposed, fixed portions of the resist material. The other films on the insulating base may be placed on selected areas of the insulating base by selective etching techniques as described or by deposition through apertured masks.

The above and other advantages and features of the invention will become more apparent upon making reference to the specification to follow, the claims and the drawings wherein:

Figures 1, 2:
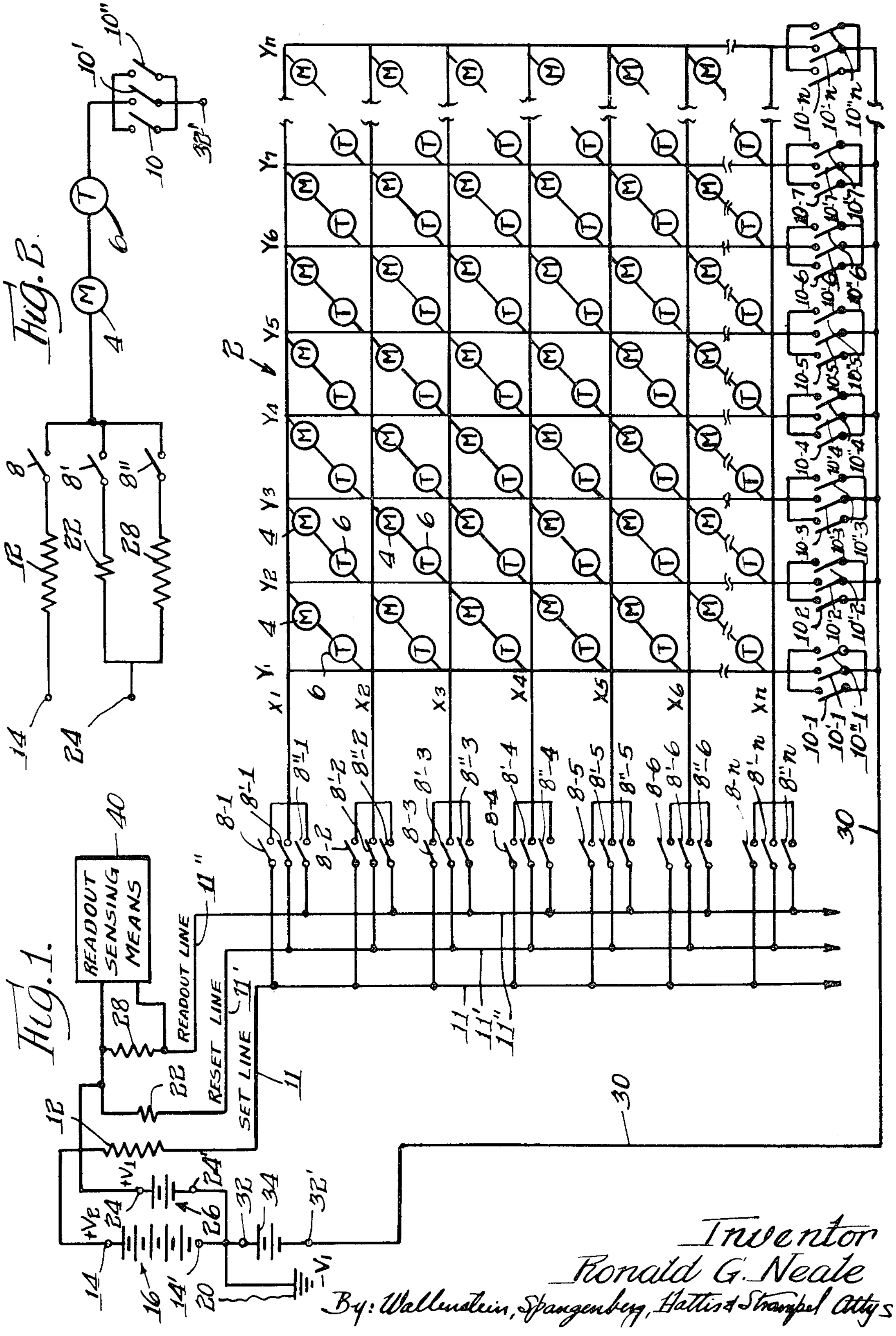
FIG. 1 is a circuit diagram of a voltage memory matrix to which the present invention may be applied and exemplary circuits for writing information into and reading information from the matrix.
FIG. 2 is a simplified diagram of the complete circuit associated with any active crossover point of the matrix.

Referring now more particularly to FIG. 1, there is shown a voltage memory matrix generally indicated by reference numeral 2 which comprises a series of mutually perpendicular X and Y conductors respectively identified as conductors X1, X2 ... Xn and Y1, Y2 ... Yn. The X and Y conductors cross one another when viewed in a two dimensional drawing, but the conductors do not make physical contact. Rather, each X and Y conductor is interconnected at or near their crossover point by a series circuit of a memory switch device 4 and a threshold switch device 6. As in the case of most memory matrices, information is stored at each crossover point preferably in the form of a binary "1" or "0" digit indicated by the state or condition of a memory element. Thus, in magnetic core matrices, the particular magnetic state of a core device determines whether a binary "1" or "0" is stored at the particular crossover point of the matrix. In the present invention, the binary digit information at each crossover point is determined by whether the memory switch device 4 thereat is in a low-resistance condition, which will arbitrarily be considered a "1" binary state, or a high-resistance condition, which will arbitrarily be considered a "0" binary state. The threshold switch device 6 isolates each crossover point from other crossover points.

A switching system is provided (the details of which may vary widely) for connecting one or more voltage sources between a selected X and a selected Y conductor to perform a setting, resetting or readout operation at the crossover point. As illustrated, each X conductor is connected to one of the ends of a set of three parallel switches 8, 8' and 8'' (which switches are identified by additional numerals corresponding to the number assigned to the X conductor involved), the other ends of which are respectively connected to set, reset and readout lines 11, 11' and 11''. The set line 11 is connected through a resistor 12 to a positive terminal 14 of a source 16 of DC voltage which produces an output of V2 volts. The negative terminal 14 of the source of DC voltage is grounded at 20 so the voltage of terminal 14 is +V2 volts. The reset line 11' is coupled through a relatively small resistor 22 to the positive terminal 24 of a source of DC voltage 26 whose negative terminal 24' is grounded at 20. The positive terminal 24 produces a voltage of +V1 volts about ground. The readout line 11'' is connected through a resistor 28 to the positive terminal 24.

Each Y conductor is connected to one of the ends of a set of parallel switches 10, 10' and 10'' which are also identified by another number corresponding to the number of the X or Y conductor involved. The other ends of these switches are connected to a common line 30 leading to the negative terminal 32′ of a source 34 of DC voltage whose positive terminal 32 is grounded at 20. The negative terminal 32′ is thus at −V1 volts with respect to ground.

The switches 8, 8′, 8″, 10, 10′ and 10″ can be high-speed electronic switches or contacts. Manifestly, high-speed electronic switches are preferred. Switch control means (not shown) are provided to close the appropriate pair of switches to connect the proper positive and negative voltage sources respectively to the selected X and Y conductors.

As previously indicated, each threshold switch device 6 and memory switch device 4 is a threshold device in that, when it is in a high-resistance condition, a voltage which equals or exceeds a given threshold value must be applied thereacross to drive or trigger the same into its low-resistance condition. If the resistance of these devices in their high-resistance conditions are of comparable or substantially equal values, to write a binary digit "1" into the memory switch device at any crossover point requires the application of a voltage across the selected X and Y conductor which equals or exceeds twice the lowest of the threshold values of the series-connected devices 4 and 6. Thus, for example, if the memory switch device 4 has a threshold value of 20 volts and the threshold device switch 6 has a threshold value of 15 volts, the voltage applied by closure of any selected pair of switches 8 and 10 should equal or preferably exceed 30 volts. This means that the sum of the outputs of DC voltage sources 16 and 34 connected between terminals 14 and 32′ should also exceed 30 volts since the values of the resistor 12 (as well as resistors 22 and 28) is infinitesimal relative to the resistance of the switch devices 4 and 6 in their high-resistance conditions. However, the resistances of the threshold and memory switch devices are preferably substantially different. Most advantageously, the nonconducting impedance of each threshold switch device 6 is at least 10 and preferably 1,000 times greater than that of the associated memory switch device. In such case with the above mentioned threshold values a binary digit "1" is written at any selected crossover point by applying a voltage across the selected series-connected switch devices 4 and 6 of at least slightly above 20 volts, preferably at least several volts above 20 volts for maximum reliability (see FIG. 3). In no event, however, must a voltage be applied which reaches or exceeds the sum of the set voltages of three crossover points since this could simultaneously set any one of a number of three series-connected crossover points in parallel with the selected crossover point.

Figures 3, 4, 5, 6, 7:
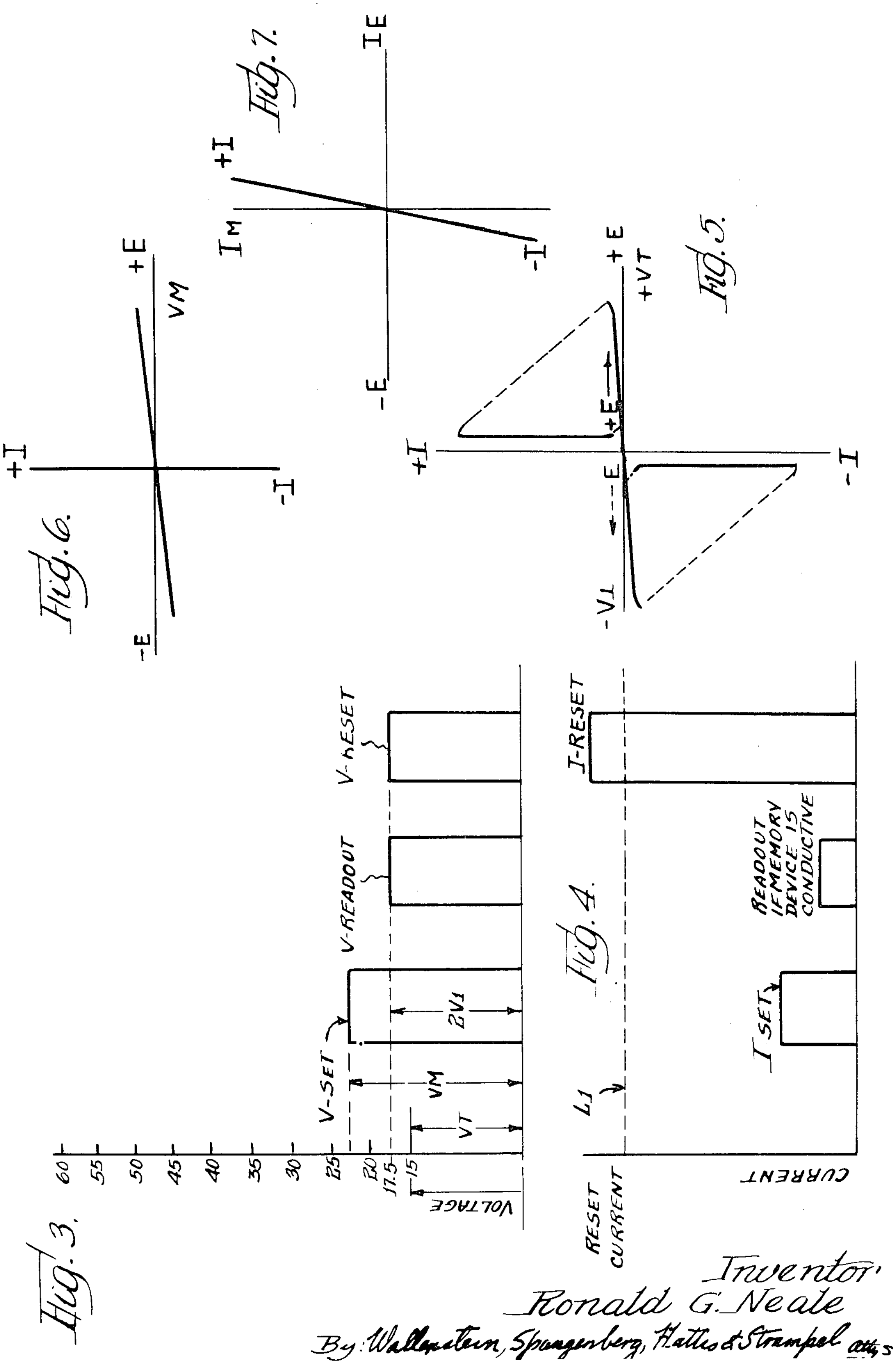
FIG. 3 illustrates the voltages which are applied to a selected crossover point of the matrix for setting the same (i.e., storing a "1" binary digit at the crossover point), for resetting the particular crossover point of the matrix (i.e., storing a "0" binary digit at the crossover point), and reading out the binary digit stored in a particular crossover point of the matrix.
FIG. 4 is a diagram illustrating the different currents which flow through the selected crossover point during setting, resetting and reading of a "1" binary digit at a particular crossover point of the matrix.
FIG. 5 is a voltage-current characteristic of a threshold switch device which may be used at each crossover point of the matrix.
FIG. 6 is a voltage-current characteristic of a memory switch device which may be used at each crossover point of the matrix when the device is in its high-resistance condition.
FIG. 7 shows the voltage-current characteristic of a memory switch device which may be used at each crossover point of the matrix when the device is in its low-resistance condition.

If the resistance values of the threshold and memory switch devices in their high-resistance conditions are substantially equal, to reset a memory switch device at a crossover point (i.e., to change it from the low-resistance condition to its high-resistance condition) the voltage applied between the reset line 11′ and the common line 30 should exceed the threshold value of the selected threshold switch device 6, since it is assumed that the resistance of any threshold switch device 6 in its normally high-resistance condition is many hundred or thousands of times greater than the resistance of the low-resistance condition of any memory switch device. Also, the applied voltage should generally be below the threshold value of the memory switch device to be reset, as shown in FIG. 3. The application of such a voltage between the reset line 11′ and the common line 30 will drive the threshold switch device 6 into its low-resistance condition. Then, if the source resistance of the reset circuit is sufficiently low that a reset current at or above level L1 (FIG. 4) flows through the memory switch device involved, the device will be reset to its high-resistance condition. Accordingly, the resistance 22 connected in series with the reset line 11′ is made sufficiently small that the desired reset current will flow through the selected memory switch device during a resetting operation. The resistor 12 in series with the set line 11 and the resistor 28 in series with the readout line 11″ are current-limiting resistors which limit the value of the current flowing through the memory switch device during a setting or readout operation to a value below the reset current level L1.

During a readout operation, a voltage is applied between the readout line 11″ and the common line 30 which is insufficiently high to drive to a low resistance a threshold switch device in its high-resistance condition in series with a memory switch device in its high-resistance condition. In the exemplary form of the invention shown in FIG. 3, where the threshold value of each threshold switch device 6 is assumed to be 15 volts and the threshold value of each memory switch device is assumed to be 20 volts, the readout voltage should exceed 15 volts and be less than 20 volts. In the example illustrated in FIG. 3, both the readout voltage and the reset voltage are selected to be midway between 15 and 20 volts.

From the circuit shown in FIG. 1, it is apparent that the sum of the outputs of the DC voltage sources 26 and 34, which is 2V1, will be approximately 17.5 volts. If the sum of the output of voltage sources 16 and 34 for a setting operation is assumed to be 22 volts, this makes the output of voltage source 16 about 13.25 volts in the exemplary circuit being described.

When a binary digit "1" is stored in a particular memory switch device, the application of a readout voltage across the associated X and Y conductor which exceeds the voltage threshold level of the associated threshold switch device will result in the flow of significant current through the resistor 28 in series with the readout line 11″. On the other hand, if the selected memory switch device is in a high-resistance condition, this readout voltage will not be high enough to trigger the memory switch device into its low-resistance condition, so substantially no current will flow through the resistor 28. Accordingly, a readout circuit 40 is provided which senses the voltage drop across the resistor 28 to determine whether or not the selected crossover point is in a binary "1" or "0" state.

As previously indicated, while the threshold and memory switch in the matrix may be of substantially any type, they are preferably of a type that comprise film deposits on any suitable insulating base, since, in such case, the fabrication costs can be minimized and the storage density of the same can be maximized. Such threshold and memory switch devices may be of the type disclosed in the aforementioned U.S. Pat. No. 3,271,591. The threshold switch device disclosed in the patent includes a film or layer of semiconductor material which is a substantially disordered and generally amorphous material in both its high-resistance and low-resistance conditions. The material has local order and localized bonding and is made so that any tendency to alter the local order or localized bonding is minimized upon changes between the high-resistance and low-resistance conditions. However, in some cases, crystalline semiconductor materials can be used for these films or layers. Many examples of such semiconductor materials are described in the aforesaid patent. Typical voltage-current characteristics of these threshold switch devices are shown in FIG. 5.

THe memory switch device which may be of the type disclosed in the aforementioned patent includes a film or layer of semiconductor material which is also a substantially disordered and generally amorphous semiconductor material which has local order and localized bonding in its high-resistance condition. However, in contrast to the threshold switch device materials, the memory switch type material is made so that the local order and localized bonding thereof can be altered to establish a conducting path or paths therethrough in a quasi permanent manner. In other words, the conductivity of the material may be drastically altered to provide a conducting path or paths in the material which is frozen in. The conducting path or paths may be realtered to substantially the original conditions by means of a current pulse. FIG. 6 shows a typical voltage-current characteristic of the memory switch device in its high-resistance condition and FIG. 7 shows that characteristic of the memory switch device in its low-resistance condition. The threshold switch devices and the memory switch devices of the aforementioned patent have symmetrical switching characteristics with respect to the polarity of the applied voltages, and, therefore, these switch devices operate in the same manner regardless of the polarity of the applied voltages. However, as expressed above other switch devices, which do not have symmetrical switching characteristics, may be utilized in the memory matrix disclosed herein.

A typical range of low-resistance values for a threshold switch device of the type disclosed in the aforementioned patent is 1 to 1,000 ohms and a typical range of high-resistance values for such a device is 10 to 1,000 megohms. A typical range of low-resistance values for a memory switch device of the type disclosed in that patent is 1 to 1,000 ohms and a typical range of high-resistance values for such a device is 10 to 1,000 megohms.

In the operation of both the threshold and memory switch devices, the switchover between high-resistance and low-resistance conditions and visa versa is substantially instantaneous and occurs along a path or paths between the conductive electrodes applied to the opposite sides of the film or layer of semiconductor material involved. The semiconductor materials disclosed in the aforesaid patent are bidirectional so that the switchover occurs independently of the polarity of the applied voltage. It should be noted from an examination of FIG. 5 and FIG. 7 that, in the low-resistance condition of the memory switch device, the current conduction is substantially ohmic so there is an increase in voltage drop thereacross with an increase of current flow therethrough. In some instances, however, it has been observed that current conduction of the memory switch device takes place at a substantially constant voltage drop across the device at relatively high current levels, although it is ohmic at lower current levels. In contrast to this, in the threshold switch devices, the voltage drop across the threshold switch device remains substantially constant over a wide range of current levels.

THe switching of a memory switch device from a low-resistance to a high-resistance condition can be achieved by applying a reset current at or above the aforesaid reset level L1 at a voltage below the threshold value of the device.

As previously indicated, unlike the threshold switch device which remains in its low-resistance condition only so long as the current flowing therethrough is above a current-holding level, the memory switch device remains indefinitely in its low-resistance condition even when the current flow therethrough is terminated and the applied voltage removed therefrom.

Figure 8:
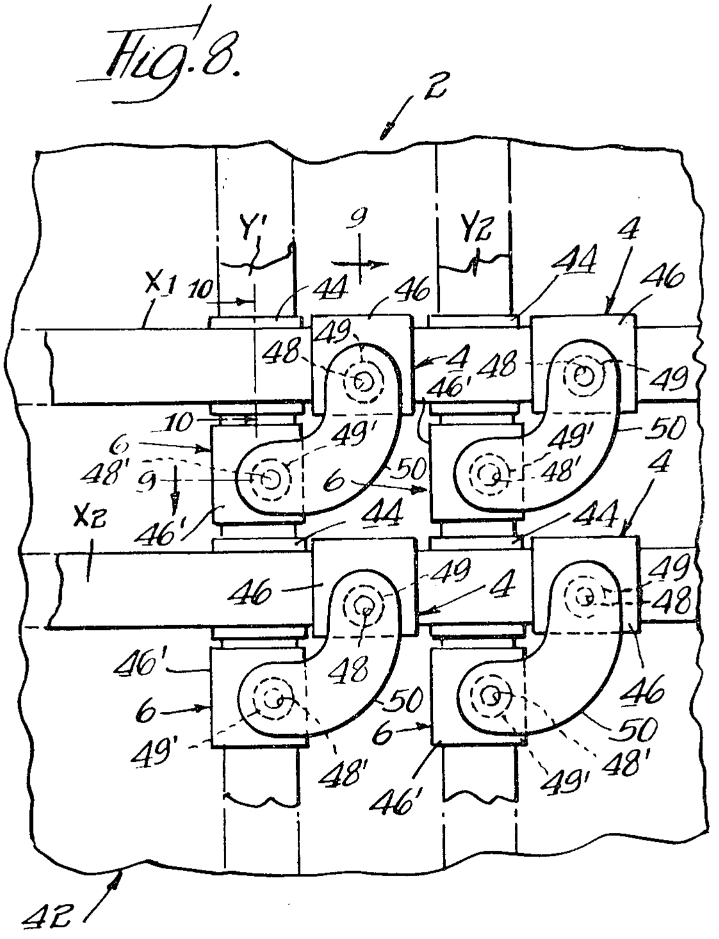
FIG. 8 is a plan view of the physical form of the memory matrix of FIG. 1, which physical form constitutes one of the aspects of the invention.
Figure 9:
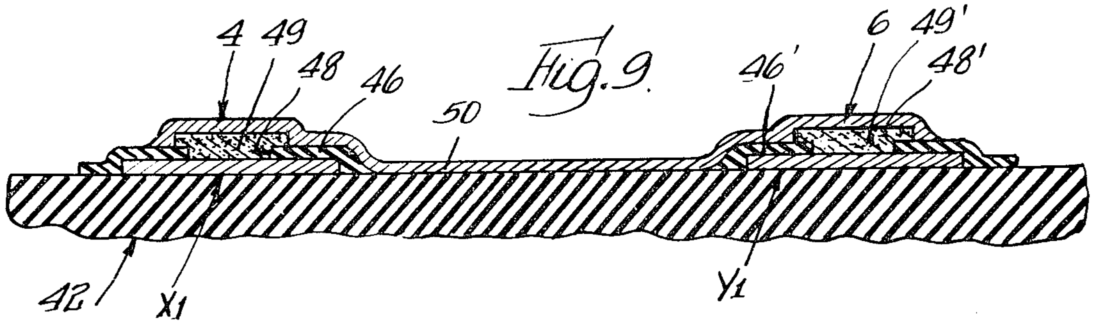
FIG. 9 is a sectional view through the matrix of FIG. 8, taken along section line 9—9 therein.
Figure 10:
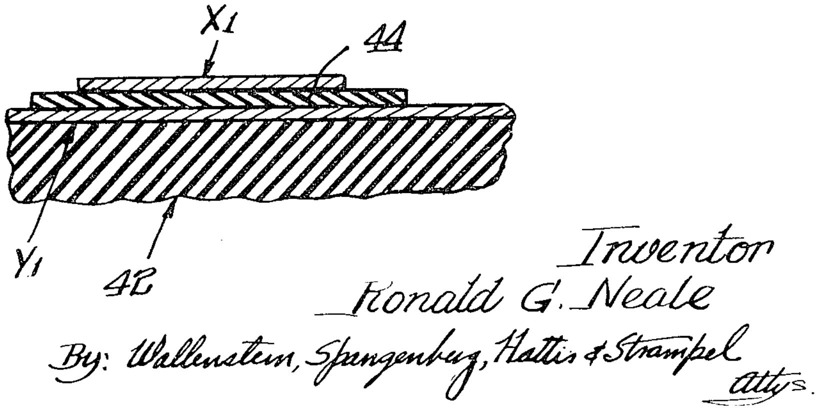
FIG. 10 is a sectional view through the matrix of FIG. 8, taken along section line 10—10 therein.

Reference should now be made to FIGS. 8—10 showing the most preferred physical form of the voltage memory matrix of the present invention. As there shown, the matrix unit includes an insulating base 42 of any suitable insulating material to which is applied by silkscreening or other means the spaced, parallel, Y conductors. At each point along each Y conductor to be crossed by an X conductor there is deposited a layer 44 of a suitable insulating material which extends across the full width of each Y conductor involved. The X conductors are then deposited by silkscreening or the like in spaced parallel bands so they pass over the insulating layers 44 to avoid electrical contact with the Y conductors at the crossover points. As shown in the illustrated embodiment of the invention, a memory switch device at each crossover point is deposited as a film in the area between the adjacent Y conductors and the associated threshold switch device is deposited as a film in the area between the adjacent X conductors. (The locations of these memory and threshold switch devices of each crossover point can obviously be reversed.) The path of current flow through a threshold or memory switch device is believed to occur in a limited path or filament in the body of semiconductor material. To ensure consistent conducting characteristics in such a device, it is believed important to constrain the flow of current through the same region and preferably the same path or filament of the body of semiconductor material each time the device carries current. To this end, as illustrated in the drawings, a layer 46 of insulating material is deposited over each conductor in the area between each adjacent pair of Y conductors. Each layer 46 of insulating material has a pore or small hole 48 therein so that only a small portion of the outer surface of each X conductor is exposed for application of a film or layer 49 of semiconductor material. Next, a film of memory switch device-forming semiconductor material is deposited over and within each pore 48, so that the semiconductor material makes contact with the X conductor over a very small area. For example, the width of each pore 48 and hence the area of contact referred to may be in the range of from about 10 to 100 microns in the most preferred form of the invention. The semiconductor material of each memory switch device can be applied by sputtering, vacuum deposition of silk-screening techniques.

In a similar fashion, there is deposited a layer 46′ of insulating material on each Y conductor in the area between each adjacent pair of X conductors. This layer 46′ of insulating material is also provided with a pore or small hole 48′ into which is subsequently deposited a film or layer 49′ of a threshold switch device-forming semiconductor material. The associated threshold and memory switch devices are connected in series by a suitable layer 50 of conducting material silk-screened or otherwise deposited in a band extending between the outer exposed surfaces of the semiconductor materials forming each pair of associated threshold and memory switch devices.

Figures 11, 12:
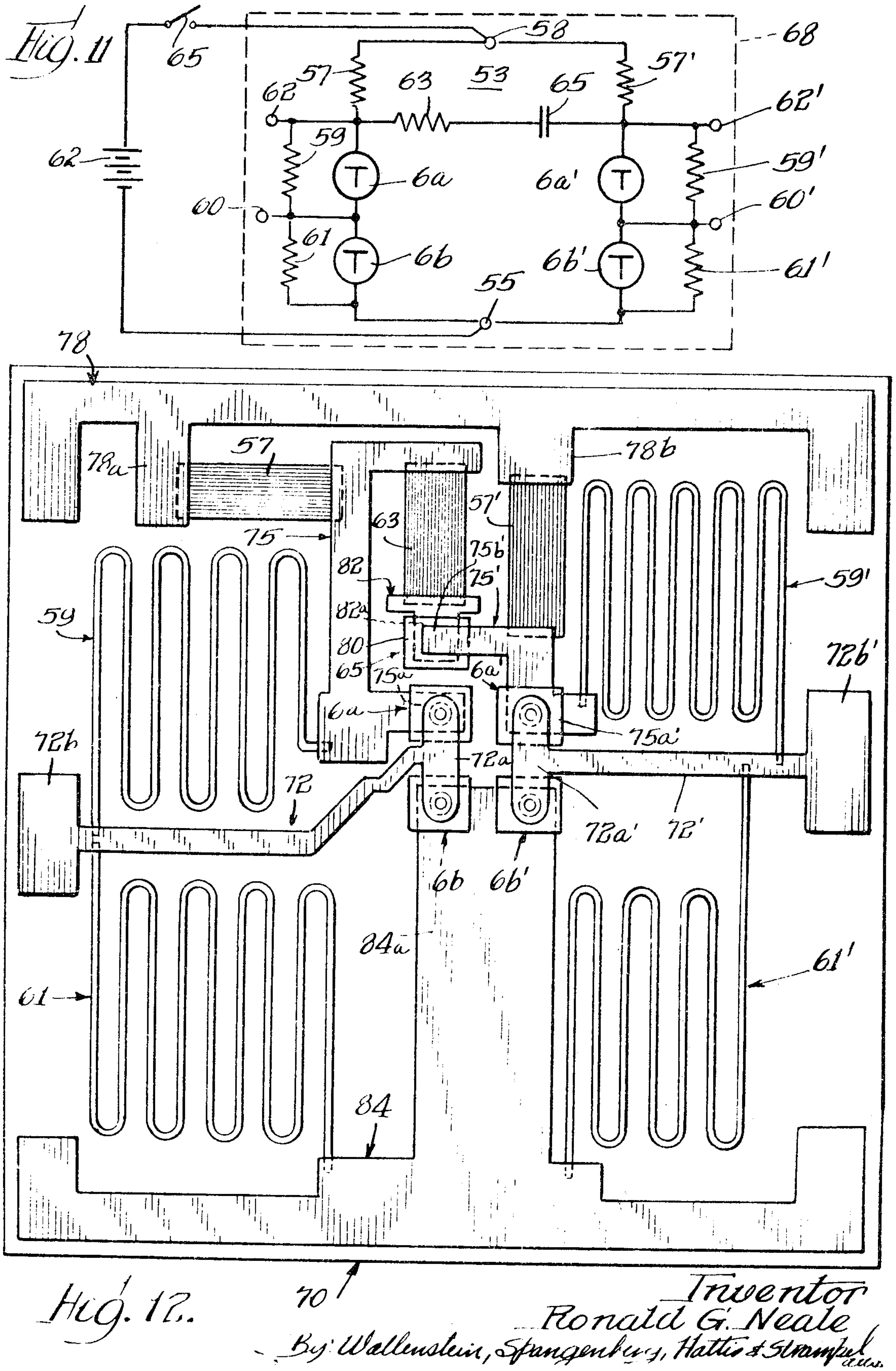
FIG. 11 is a circuit diagram of a basic control circuit which can be completely made by film deposits on an insulating board in accordance with the present invention.
FIG. 12 illustrates a circuit board having all the elements of the circuit of FIG. 11 as film deposits thereon.

Some aspects of the invention are applicable in circuits other than memory matrix circuits, such as switching matrix circuits where there is only a threshold switch device at some crossover points of the matrix and no switch devices at other crossover points. Also, some aspects of the invention are applicable to printed circuits generally, as illustrated by FIGS. 11 and 12, to which reference should now be made. FIG. 11 is a schematic diagram of the film deposited circuit 53 shown in FIG. 12. The circuit is a bistable circuit including a pair of threshold switch devices 6*a*–6*b* connected in series between terminal 55 and one end of a resistor 57, the other end of which is connected to a terminal 58. A pair of resistors 59 and 61 are respectively connected across the terminals of the threshold switch devices 6*a*–6*b*. A signal input terminal 60 is connected to the juncture of the threshold switch device 6*a*–6*b*. The circuit 53 further includes another pair of threshold switch devices 6*a*′–6*b*′ which are connected in series between the terminal 55 and one end of a resistor 57′, the other end of which is connected to terminal 58. Resistors 59′ and 61′ are respectively connected across the terminals of the threshold switch devices 6*a*′–6*b*′. Output terminals 62 and 62′ are respectively connected to the junctures of the threshold switch devices 6*a*–6*a*′ and resistors 57–57′. The terminals of a source DC voltage 63 are connected through an on-off switch 65 without concern for the polarity connections respectively to the terminals 55 and 58. In the exemplary circuit 53, the threshold voltage value of each of the threshold switch devices 6*a*, 6*a*′, 6*b* and 6*b*′ were in the range of from 6 to 10 volts and the output of the source of DC voltage 63 was in a range of about 8 to 15 volts. The voltage appearing across the terminals of any one of the threshold switch devices in the absence of an external signal voltage is insufficient to the threshold switch devices into a low-resistance conditions.

A selected pair of threshold switch devices is driven into a conductive state by the feeding of a voltage between one of the signal input terminals 60 or 60′ and the terminal 55 which exceeds the threshold value thereof to drive the threshold switch device 6*b* or 6*b*′ into its low-resistance condition. The value of the resistors 59–61 and 59′–61′ are preferably 10 or more times the value of resistors 57 and 57′ so that the firing of the threshold switch device 6*b* or 6*b*′ will result in the presence of substantially the entire output of the source of DC voltage 62 across the associated threshold switch device 6*a* or 6*a*′ to drive the same into its low-resistance condition. The pair of threshold switch devices involved are thusly driven practically simultaneously into conductive states to suddenly cause a sharp reduction in the voltage at the associated output terminal 62 of 62′. Part of the sudden drop of voltage is coupled through a resistor 63 and a capacitor 65 to the other pair of threshold switch devices which, if they were already in their low-resistance conditions, would be driven to their high-resistance condition. The conductive conditions of the pairs of threshold switch devices thus can be reversed by the feeding of a firing voltage to the signal input terminal 60 or 60' associated with the pair of threshold switch devices which are in a high-resistance condition at any instant.

Referring now to FIG. 12, all the circuit elements enclosed by dotted lines 68 in FIG. 11, namely all the circuit elements but the on-off switch 65 and the source of DC voltage 63, are shown as film deposits on an insulating base 70. The size of the film-deposited circuit shown in FIG. 12 is greatly magnified. For example, the size of the insulating base 70 thereshown may be of a ½-inch square or smaller. The various film-deposited circuit elements shown in FIG. 12 are identified by the same reference numerals used to identify the same in FIG. 11. Each of the threshold switch devices *6a*, *6b*, *6a'*, *6b'* may be a series of layers of conductor and semiconductor materials substantially identical to that of the threshold switch devices 6 shown in FIGS. 8 through 10, and thus a further description of these layers will not now be given. THe upper electrode of the threshold switch devices *6a* and *6b* are formed by an extension *72a'* of layer 72 of highly conductive material which also connects the threshold switch devices *6a*–*6b* in series. The layer 72 of conductive material has another extension *72b* which may form the aforementioned signal input terminal 60. A layer 72' of highly conductive material is provided having an inner extension *72a'* which forms the outer electrodes for the threshold switch devices *6a'* and *6b'* and connects the same in series, and an outer extension *72b'* which forms the signal input terminal 60'. The bottom electrode of the threshold switch device *6a* is formed by the extension *72a* of a layer 75 of conductive material. The layer of conductive material 75 overlies one of the ends of resistor-forming deposits constituting the resistors 57, 59 and 63. Resistors 57 and 63 (as well as resistor 57') may be of relatively small value (e.g. 1,500 ohms) and thus are shown as rectangular-shaped deposits of resistor-forming material while resistor 59 and the other resistors 61, 59' and 61' have resistance values many times this value (e.g. 100,000 ohms) and are, therefore, shown as narrow zig-zagging deposits of resistor-forming material. The other end of the resistor-forming deposit forming the resistor 59 is overlayed by a portion of the layer 72 of conductive material. The other end of the resistor-forming deposit forming the resistor 57 is overlayed by an extension *78a* of a bus-forming layer 78 of highly conductive material.

The bottom electrode of the threshold switch device *6a'* is formed by an extension *75a'* of a layer 75' of conductive material which also overlays one end of a rectangular deposit of resistor-forming material forming the resistor 57'. The other end of the resistor 57' is overlaid by an extension *78b* of the layer 78 of conductive material. The extension *75a'* of the layer 75' of conductive material also overlays one end of a narrow zig-zagging deposit of resistor-forming material constituting the resistor 59'. The other end of the resistor 59' is overlaid by the layer 72' of conductive material.

The layer 75' of conductive material forming the bottom electrode of the threshold switch device *6a'* has an extension *75b'* which overlies a layer 80 of insulating material forming the dielectric of the capacitor 65 and forms one of the plates of the capacitor 65. The layer 80 of insulating material is deposited over an extension *82a* of a layer 82 of highly conductive material deposited on the insulating base 70, which extension *82a* constitutes the bottom plate of the capacitor 65. The layer 82 of conductive material overlays the other end of the layer of resistor-forming material constituting the resistor 63. The opposite ends of the layer of resistor-forming material constituting the resistor 57' are overlaid respectively by portions of the layer 75' and the layer 78 of conductive material. The bottom electrodes of the threshold switch devices *6b* and *6b'* are formed by an extension *84a* of a layer 84 of highly conductive material deposited on the insulating base 70. The opposite ends of a narrow zig-zagging deposit of resistor-forming material constituting the resistor 61' are respectively overlaid by the layer 84 and the layer 72' of conductive material, as shown. Similarly, the end of the zig-zagging deposit of resistor-forming material constituting the resistor 61 are respectively overlaid by portions of the layer 72 and 84 of conductive material. The energizing voltage input terminals 58 and 55 in FIG. 11 may be constituted by any portion of the layers 78 and 84 of conductive material to which external connections can be conveniently made. The output terminals 62 and 62' may be formed by any portion of the layer 75 and 75' of conductive material to which external connections may be conveniently made.

Figure 13:
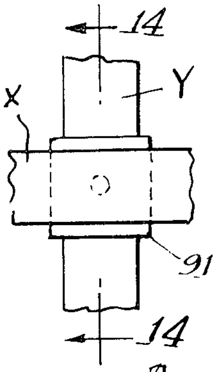
FIG. 13 is a partial plan view of an alternate form of this invention.
Figure 14:
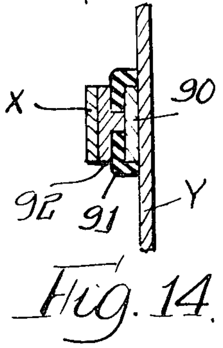
FIG. 14 is a sectional view taken along line 14—14 of FIG. 13.

Referring now to FIGS. 13 and 14 there is shown an alternate form of constructing switching matrices using the principles of this invention. Here the Y axis conductor receives a deposited film or layer 90 of semiconductor material of the above-mentioned memory type. An apertured insulator 91 is deposited over the layer 90 and preferably surrounds or covers three sides of the layer 90 except in the region of the aperture. A film or layer 92 of semiconductor material of the above-mentioned threshold switching type is deposited over the insulator 91 and has portions thereof extending through the aperture in the insulator in contact with the layer 90. The X axis conductor is then deposited in contact with the layer 92 to complete the circuit construction at the juncture of the X and Y axes conductors. The entire switching matrix array can be constructed in this manner.

It is apparent that some aspects of the present invention enable complete circuits to be formed by simple film deposits on one side of a base of insulating material so that entire circuits can be made simply and economically by automatic, mass production machines.

It should be understood that numerous modifications may be made in the specific forms of the invention disclosed in the drawings and described above without deviating from the broader aspects of the invention.

I claim:

1. A memory matrix comprising an insulating base, parallel bands of X or Y axis conductors deposited on one side of said insulating base, said insulating base including parallel bands of Y or X axis conductors crossing said X or Y axis conductors and insulating material interposed between the X and Y axis conductors at the crossover points to insulate the same, a pair of series connected switch devices coupled between the X and Y axis conductors of each active crossover point, at least one of the switch devices including a deposited layer of semiconductor material located adjacent each crossover point of said X and Y axis conductors, the other switch device including a deposited layer of semiconductor material located adjacent each crossover point of said X and Y axis conductors, the deposited layer of semiconductor material of one of the switch devices of each pair of switch devices being a threshold switch device-forming material having a relatively high-resistance condition when the value of the voltage applied thereto is below a first voltage threshold level and is switched to a relatively low-resistance condition when the value of the voltage applied thereto reaches said first voltage threshold level which low-resistance condition remains until the value of the current therethrough drops below a given holding value, and the deposited layer of semiconductor material of the other switch device of each pair of switch devices being a memory switch device-forming material which is triggered into a stable relatively low-resistance condition when the value of the voltage applied thereto exceeds a second voltage threshold level and which condition remains in such low-resistance condition independently of the presence or absence of an applied voltage until reset to a high-resistance condition by the feeding of a given reset current pulse therethrough.

2. The memory matrix of claim 1 wherein the reset current of each of said memory switch device is a current pulse exceeding a given value.

3. The memory matrix of claim 1 wherein said threshold and switch devices are bidirectional devices which conduct current in either direction and said threshold voltage levels and reset current pulse are independent of the polarity of the applied voltage or the direction of current flow.

4. The memory matrix of claim 1 wherein there is provided set means for applying between any selected X axis conductor and any selected Y axis conductor of an active crossover point a set voltage which drives both the threshold switch device and the memory switch device associated with the selected crossover point into their low-resistance condition; reset means for applying between any selected X axis conductor and any selected Y axis conductor of an active crossover point a reset voltage which drives the threshold switch device associated with the selected crossover point to its low-resistance condition when the associated memory switch device is in its low-resistance condition and feeds a reset current pulse through the memory switch device; and readout means for applying between any selected X axis conductor and any selected Y axis conductor a readout voltage which exceeds the threshold level of the associated threshold switch device and is of only sufficient value to drive the associated threshold switch device to its low-resistance condition if the associated memory switch device is in its low-resistance condition, to produce a current flow other than the reset current pulse.

5. The memory matrix of claim 4 wherein the applied readout voltage for a readout operation is operable at a given magnitude independently of the polarity thereof.

6. In combination with an insulating base having a conductive deposit thereon, a deposited film semiconductor device carried by said insulating base, said device including a layer of insulating material applied over said conductive deposit, said layer of insulating material having a small hole extending therethrough, a body of semiconductor material overlying said layer of insulating material and extending into said hole where it makes contact with said conductive deposit on said insulating base over an area limited by the size of said hole, and a conductive deposit over the outer surface of said semiconductor material.

7. The combination of claim 6 wherein said semiconductor material has a high-resistance condition where it is substantially nonconductive and is switched to a low-resistance condition where it conducts current in a filamentous path through the semiconductor material when a voltage is applied across said semiconductor material which exceeds a given threshold voltage level.

8. The combination of claim 7 wherein said body of semiconductor material conducts current in either direction and said threshold voltage level is independent of the polarity of the applied voltage.

9. A switching and memory matrix array comprising: a support base including a plurality of parallel X or Y axis conductors deposited on said support base; a plurality of discrete first layers of semiconductor material deposited on said support base adjacent said plurality of X or Y axis conductors and electrically coupled thereto and arranged in substantially parallel rows; a plurality of discrete second layers of semiconductor material deposited on said support base and respectively connected to and adjacent said plurality of discrete first layers of semiconductor material and respectively electrically connected in series therewith; and said support base having a plurality of Y or X axis conductors insulated from and extending transversely of the X or Y axis conductors and connected to said plurality of discrete second layers of semiconductor material, one of said discrete layers of said semiconductor material being of a memory switch device-forming type which is triggered into a stable relatively low-resistance condition when the value of the voltage applied thereto exceeds a first voltage threshold level and which condition remains in such low-resistance condition independently of the presence or absence of an applied voltage until reset to a high-resistance condition by the feeding of a given reset current pulse therethrough, and the other of said discrete layers of semiconductor material being of the threshold switch device-forming type having a relatively high-resistance condition when the value of the voltage applied thereto is below a second voltage threshold level and is switched to a relatively low-resistance condition when the value of the voltage applied thereto reaches said second voltage threshold level which low-resistance condition remains until the value of the current therethrough drops below a given holding current.

10. The memory matrix of claim 1 wherein said deposited layer of semiconductor material forming said at least one of the switch devices of each crossover point is deposited over the portion of the associated X or Y axis conductor involved between the associated Y or X axis conductor and the immediately adjacent Y or X axis conductor and the deposited layer of semiconductor material of the other of said switch devices is deposited over the portion of the associated Y axis conductor between the associated X axis conductor and the immediately adjacent X axis conductor.

11. The switching and memory matrix array of claim 9 wherein said plurality of discrete first layers of semiconductor material are deposited on each of the said plurality of X or Y axis conductors, said plurality of discrete second layers of semiconductor material are deposited over said plurality of discrete first layers of semiconductor material and said plurality of Y or X axis conductors are deposited on said plurality of discrete second layers of semiconductor material.

12. The switching and memory matrix array of claim 11 further including an apertured insulator deposited between each of said plurality of discrete first layers of semiconductor material and each of said plurality of discrete second layers of semiconductor material such that electrical contact is made between each of said first and second layers through the aperture formed in their associated insulator.

13. The switching matrix of claim 1 wherein all of said bands of X and Y axis conductors are deposits on the same side of said insulating base.

14. The switching and memory matrix of claim 9 wherein said first layer of semiconductor material of each crossover point is located respectively in alignment with said X or Y axis conductor thereat, and said second layer of semiconductor material thereof is located respectively in alignment with the other of same.

15. A memory matrix comprising: a matrix-forming unit including a nonconducting supporting base; a first group of parallel bands of conductors; a second group of parallel bands of conductors deposited as a film on one side of said base and arranged so that each band in said second group crosses each band in said first group forming a matrix of crossover points; memory means located at or adjacent each of said crossover points for selectively connecting and disconnecting the two bands of conductors crossing at each said crossover point, each memory means being a film of semiconductor memory material deposited on said one side of said base and having at least a stable relatively high-resistance condition and a stable relatively low-resistance condition and being resettably switched into said stable low resistance condition when the value of voltage applied thereto exceeds a certain threshold level and which remains in such low-resistance condition even in the absence of an applied voltage or current until reset into said high-resistance condition in response to a certain momentary reset signal; and isolating means at or adjacent each of said crossover points connected in series circuit with said memory means thereat between the two associated bands of crossing conductors for isolating said memory means thereat from other memory means associated with other crossover points, wherein an applied voltage for altering any selected memory means from said high to said low-resistance condition or a reset signal for resetting the same to said high-resistance condition are not erroneously short circuited through memory means in said low-resistance condition at different crossover points.

16. The memory matrix of claim 15 wherein there is provided insulating material deposited on said one side of said base at said crossover points which provides insulation between said crossover points.

17. The memory matrix of claim 15 wherein said film of semiconductor memory material forming the memory means of each crossover point is a film of material physically separated from other films of semiconductor memory material forming the memory means at the other respective crossover points.

18. The memory matrix of claim 15 wherein said deposited film of semiconductor memory material forming each said memory means is resettable to said relatively high-resistance condition when said reset signal is of the same polarity as the voltage which switches the same to said low-resistance condition.

19. The memory matrix of claim 15 wherein said deposited film of semiconductor memory material forming the memory means associated with each crossover point forms a bidirectional memory device which can conduct current in either direction, and wherein said threshold level is independent of the polarity of the applied voltage or the direction of current flow therethrough, and said reset signal can be of either polarity to reset said semiconductor material to said relatively high-resistance condition.

20. The memory matrix of claim 15 wherein the memory means and isolating means associated with each crossover point are in alignment with one another and the associated crossover point.

21. The memory matrix of claim 15 wherein said memory means and isolating means associated with each crossover point are located one over the other between the associated crossing bands of conductors at the crossover point.

22. The memory matrix of claim 15 wherein said isolating means and first group of parallel bands of conductors form a single integral body with said base, said deposited memory means and second group of parallel bands of conductors being deposited with said second group of parallel bands of conductors passing over said first group of parallel bands of conductors.

23. The memory matrix of claim 22 wherein both groups of crossing bands of conductors are deposits on the same side of said base.

24. The memory matrix of claim 23 wherein said memory means and isolating means at each crossover point are both deposits of semiconductor material on said same side of the base.

25. The memory matrix of claim 15 wherein said memory means and isolating means at each crossover point are respectively located at points adjacent to but spaced from the associated crossover point and respectively in alignment with the respective bands of conductors crossing thereat.

* * * * *